United States Patent Office 3,406,130
Patented Oct. 15, 1968

3,406,130
MOLDABLE CELLULOSE POLYMER - MOLDABLE OXYMETHYLENE POLYMER BLEND - COLLOIDAL DISPERSIONS
Stewart B. Neff, Edison, N.J., assignor to Celanese Corporation, a corporation of Delaware
No Drawing. Filed Feb. 15, 1965, Ser. No. 432,881
16 Claims. (Cl. 260—13)

ABSTRACT OF THE DISCLOSURE

Colloidal dispersions of (1) a thermoplastic resinous blend of (a) a moldable cellulose polymer having free hydroxyl groups, e.g., a partially esterified cellulose acetate, and (b) up to about 50% of the weight of said blend of a moldable oxymethylene homopolymer or copolymer containing at least 60 mol percent of recurring oxymethylene (—$CH_2O$—) units, in (2) an inert volatile organic solvent for said cellulose polymer, said dispersions being of such stability that they undergo no substantial observable gelation or precipitation upon standing at room temperature for periods of up to as much as one year.

---

This invention relates to cellulosic compositions and, more particularly, to colloidal dispersions thereof with high molecular weight polyacetals.

Dispersions of cellulosics in certain reagents and principally inorganic solvents, such as Schweitzer's reagent (cuprammonium hydroxide), certain quaternary ammonuim hydroxides, calcium thiocyanate, zinc chloride, and trifluoroacetic acid, wherein the cellulosic is dissolved or gelatinized, are known to the art. Also known, of course, are the common solvent systems for cellulose fiber spinning and for the formation of cast films.

Solutions of certain formaldehyde polymers in phenols or aralkanols are described in U.S. Patent 2,775,570, issued to Barkdoll et al. on Dec. 25, 1956. While these solutions are useful for viscosity measurements and for the preparation of certain cast films consisting of formaldehyde polymers, considerable difficulties are occasioned in their usage, especially where concentration exceeds 1 or 2 percent, in that precipitation or gelation occurs when the solutions are cooled below the saturation point. Despite the availability of these and other viscosity solvents, no suitable stable system existed for the preparation of cast products containing a high molecular weight polyacetal.

It has now been discovered that colloidal dispersions of cellulose polymers, containing a high molecular weight polyacetal, may be prepared. The dispersions are useful in the preparation of cast products and especially films, containing up to about 50 weight percent of the polyacetal, and are remarkably stable, i.e., they undergo no substantial observable gelation or precipitation upon standing at, e.g., room temperature for periods of up to as much as 1 year. The cast products contain both the cellulosic and the high molecular weight polyacetal and thus provide added property advantages of the blend over the cellulosic alone, e.g., unexpectedly high melt strength and elongation.

The disperse system consists of the cellulosic in combination with from about 1 up to about 50 parts by weight, and preferably no more than 40 parts by weight, of a high molecular weight polyacetal, and a dispersion medium.

The cellulosic component may be of any type generally known to the art having an anhydroglucose basic structure, but is selected to have some degree of free hydroxyl content. Generally, the cellulosic component should have an average of at least about 0.5 out of three available hydroxyl groups remaining unesterified. Esterified cellulosics, however, are to be preferred and, while the carboxylic acid component may contain from about 2 to about 6 carbon atoms, the lower carboxylic acids, e.g., having no more than about 4 carbon atoms, are particularly preferred. The degree of esterification is selected to be no greater than 2.8 and preferably no greater than 2.4. While cellulose acetate, having only 1.5 to 2.0 substituted hydroxyl groups may be employed (ca. 40 percent combined acetic acid, or 28.7 weight percent acetyl), a degree of esterification represented by an acetyl content of 37 to 41 weight percent, or a combined acetic acid value of 52 to 58 percent, constitutes the preferred embodiment.

Suitable esterified cellulosic components include primary, secondary and tertiary cellulose acetate, propionate, butyrate, their mixed esters such as cellulose acetate propionate, cellulose acetate butyrate, cellulose propionate butyrate, and the corresponding esters of higher carboxylic acids having up to about 6 carbon atoms. Other cellulosic components are those having a wide variety of organic substituents, including nitro, methyl, ethyl, carboxymethyl, hydroxyethyl, cyanoethyl, etc.

While the description of this invention relates principally to the use of plasticized cellulosic compositions, it is to be understood that the cellulosic alone may be suitably employed.

The plasticized compositions may comprise any otherwise suitable cellulosic plasticizer known to the art, in conventional proportions which generally range from about 2 to about 70 preferably from about 5 to about 60, parts by weight, based upon the cellulosic.

Conventional plasticizers such as the carboxylic acid esters, and particularly the dicarboxylic acid esters, including diethylphthalate, dibutylphthalate, dipropylphthalate, dioctylphthalate, dibutyl sebacate, diethyl sebacate, ethyl hydrogen 1,2-benxene dicarboxylate, and the corresponding suberates and azelates are suitable. Generally the carboxylic acid moiety is a saturated hydrocarbon having up to about 10 carbon atoms, and the ester is an alkyl group having up to about 5 carbon atoms.

While the plasticizer level governs the melt index values obtained upon a plasticized composition, so that $10x$ melt index values may range between about 0.1 and 1500 dg./min., at preferred plasticizer levels, e.g., 15 to 70 parts per 100 parts of cellulose actate and 2 to 35 parts per 100 parts of cellulose propionate, based on the cellulosic, the plasticized cellulosic component gives $10x$ melt index values of between about 10 and 1500, preferably 85 to 100 dg./min. for cellulose propionate, and 10 to 1500, preferably 120 to 225 dg./min. for cellulose acetate. Corresponding $1x$ melt index values are between about 0.1 and 15.0, preferably 0.5 to 3.0 dg./min. for cellulose propionate, and 0.5 to 15.0, preferably 0.5 to 5.0 dg./min. for cellulose acetate.

The polyacetals employed in the practice of this invention are characterized as having at least 60 mol percent of recurring oxymethylene units (—$CH_2O$—) derived from, e.g.formaldehyde, trioxane or another cyclic acetal, and may comprise in minor proportion a wide variety of other monomeric units derived from, e.g., lactones, carbonates, cyclic acid anhydrides, glycidyl ethers, olefin oxides, higher aldehydes, or ethylenically unsaturated compounds such as styrene, divinyl ether, vinyl acetate, vinyl methyl ketone, or acrolein. Suitable polyacetals include the copolymers and terpolymers found generally disclosed in Kern et al., Angewandte Chemie, 73, pp. 176–186 (1961), Sittig, M., Hydrocarbon Process and Petroleum Refiner, 41, pp. 131–170 (1962), and Weissermel et al., Kunstoffe, 54, pp. 410–415 (1964).

The suitable polyacetals are solid, thermoplastic, moldable materials having a number average molecular weight generally in excess of 20,000, preferably between about 30,000 and 80,000. Most suitably employed are the copolymers and terpolymers having at least 75 mol percent, up to about 99.66 mol percent, of recurring oxymethylene units, and containing up to 15 mol percent of units providing —C—C— bonds to the basic structural chains.

Particularly preferred are the copolymers having at least one chain containing at least 85 mol percent of recurring oxymethylene units interspersed with up to about 15 mol percent of —OR— units, wherein R is a divalent radical containing at least two carbon atoms directly linked to each other and positioned in the chain between the two valences, with any substituent in the R radical being inert. Such copolymers are found disclosed, for example, in U.S. Patent No. 3,027,352, of Walling et al., incorporated herein by reference.

Another preferred embodiment utilizes polyacetal terpolymers having at least one chain containing at least 85 mol percent of recurring oxymethylene units interspersed with up to about 15 mol percent of —OR— units, wherein R is a divalent radical containing at least two carbon atoms directly linked to each other and positioned in the chain between the two valences, with any substituent in the R radical being inert, at least 0.01 up to 7 mol percent of said —OR— units having carbon atoms linked to other chains. Such copolymers are found disclosed in commonly assigned U.S. patent application Ser. No. 229,715 of Heinz and McAndrew, filed Oct. 10, 1962, and incorporated herein by reference.

Polyacetals modified with chain transfer, end-capping, or cross-linking agents, such as agents disclosed in U.S. Patent Nos. 3,017,389 of Langsdorf et al., issued Jan. 16, 1962, and 2,964,500 issued Dec. 3, 1960, to Jenkins et al.; commonly assigned application Ser. Nos. 60,555 filed by Dolce on Oct. 5, 1960, and 89,371 filed by Schnizer, Heinz and Seddon on Feb. 15, 1961; and the Kern et al. and Sittig articles referred to hereinabove, are also operable, and where oxymethylene homopolymers are employed, modification with esterification agents such as carboxylic acid moieties is to be preferred. Thus, oxymethylene homopolymers having acetyl end groups are suitable in the practice of this invention.

The polyacetals generally exhibit 1x melt index values of between about 0.2 and 50 dg./min., preferably between about 0.5 and about 30 dg./min., and 10× melt index values of between about 10 and 900 dg./min., preferably not more than 500 dg./min. 10x/x ratios may range between 15 and 150 although values from 16 to 20 are preferred.

The dispersion medium may be any suitable solvent for the cellulosic component, including but not limited to acetone, ethylene glycol monoethyl ether, butyl acetate, m-cresol, methyl ethyl ketone, methyl formate, methyl acetate, ethyl acetate, propyl acetate, amyl acetate, ethyl butyrate, acetic anhydride, nitrobenzene, dioxane, butanol, methylene chloride, trichloroethylene, methyl cellosolve acetate, diacetone alcohol, ethylene dichloride/ethyl alcohol, nitromethane/ethyl alcohol, etc. The solvent is generally organic, inert with respect to the components, volatile, and preferably exhibits a medium rate of evaporation equivalent to e.g., the 20 to 30 minute period for the preparation of a cast film of 5 to 10 mils with acetone/ butyl alcohol at room temperature. Preferably, the solvent is an organic ester, ketone or alcohol having up to about 10 carbon atoms. Substituents may include e.g., alkyl, such as methyl or butyl; haloalkyl, such as chloromethyl; alkoxy, such as ethoxy; hydroxy; cyano; nitro; halogen, such as bromine, iodine or fluorine; etc. The combination of a lower hydrocarbon ketone such as acetone with a lower alkyl alcohol such as butyl alcohol, or a lower alkyl ester such as butyl acetate, is particularly preferred. With a common charge of 50 parts for the resin, the dispersion medium may be provided in amounts ranging from 50, preferably 75 cc., to 1,000 cc. or more, depending upon the desired viscosity of the resulting dispersion. Preferably, amounts of 100 to 300 cc. are employed.

The disperse systems are prepared by a conventional melt blending technique. As distinguished from the blend compositions described in copending application Ser. No. 432,838, filed concurrently herewith by Price on Feb. 15, 1965, and incorporated herein by reference, the systems may not be prepared by a variety of other common blending processes such as cosolution and coprecipitation, since the polymer moieties present in the dispersion medium tend to settle out when prepared by these processes. Apparently the melt blending occasions a greater homogeneity, facilitating molecular aggregation, or perhaps some molecular interaction in the nature of hydrogen bonding or complexing occurs during blending in the plastic state. Therefore, blending at elevated temperatures, where at least one component is maintained in plastic state, is preferred.

Thus, the blending is preferably carried out by charging one or both components in one or more batches, separately or as a master batch comprising principally one component subsequently cut with additional amounts of the other component, to a reaction zone maintained at an elevated temperature above the melting point of at least one component, generally between about 100° C. and 220° C. and preferably between about 150° C. and 200° C., and vigorously mixing and shearing for a period between about 1 and about 20 minutes until substantial homogeneity has been achieved, as measured by e.g. clarity, transparency, degree of turbidity, absence of gels, etc. upon visual examination of a molded disc.

Usually, a high shear mixing device, such as a "Brabender Plasticorder" or a "Banbury" mixer, comprising oppositely driven spiral rotors enclosed within a mixing chamber, is employed. The "Banbury" mixing chamber comprises two overlapping cylindrical chamber sections with a ridge between them. The rotors revolve in opposite directions and at slightly different speeds, keeping the mixture in constant circulation. The ridge between the cylindrical chamber section helps force intermixing, and the acute convergence of the rotors within the chamber walls imparts a smearing. Temperature control is achieved by the circulation of cooling water or steam through cores in the rotors and through cores in the walls of the mixing chamber. Pressure may be exerted on the mixing chamber by a weighted ram in the hopper throat.

The blending may also be carried out in a plastograph blending device which comprises a jacketed chamber containing oppositely driven rotors having gladed surfaces of, e.g., sigma, delta, roller or cam configuration optionally blanketed in an inert gas, e.g., nitrogen, driven with a constant or variable speed ranging from a few r.p.m. up to about 200 r.p.m. Temperatures in the range of about 165° C. up to 250° C. or higher are obtained by employing a suitable heating oil in the chamber jacket. Generally roller head rotors are employed, driven at speeds in the range of 20 to 40 r.p.m. at temperatures between about 180 and 220° C. The plastograph blending may be carried out at different r.p.m. and temperatures within the ranges specified above for varied periods of time, giving appropriate consideration to the desirability of reducing shear to a point where mechanical degradation of the resin is minimized, and maintaining temperatures below the point where thermal degradation of the resin becomes substantial, etc. Thus, one may employ a higher speed with reduced treatment periods and slightly increased temperatures or decreased speed for longer times at decreased temperatures. Optimum results were achieved in the plastograph with mixing times of 8 to 10 minutes.

The blending may also be carried out in a roll mill apparatus having oppositely rotating hollow cylindrical rolls of, e.g., 12″ diameter, driven at a speed in the range of 20 to 40 r.p.m., and steam heated to a temperature in the range of 165° C. to about 195° C. The cylindrical rolls have a variable clearance ranging down to a few thousandths of an inch which clearance is varied during the course of the milling. A typical run involves charging one or both resins to the rolls with a load time of about 3 to 5 minutes, and rolling for 4 to 5 minutes to melt. The blend, which adheres to the rolls, is kneaded with reduced clearance between the rolls for a period of about 5 minutes and then cut and cooled.

It is to be understood that conventional additives, including stabilizers, lubricants, fillers such as glass powder or chopped strand, finely divided copper, etc., coloring agents such as titanium dioxide, and dyes may be utilized with either or both of the resin components. Stabilized compositions comprising, e.g., an epoxy compound, triphenyl phosphite, octyl phenol, calcium lactate, resorcinol monobenzoate, 2,2′-dihydroxy-4,4′-dimethoxybenzophenone, phenyl salicylate, 2,6-ditertiarybutyl-p-cresol, etc., in combination with the cellulosic; and, e.g., at least one amidine compound such as melamine, cyanoguanidine together with a phenolic such as an alkylene bisphenol, e.g., 2,2′-methylene(4-methyl-6-t-butyl phenol) in combination with the polyacetal, are preferred in the practice of this invention. Other polyacetal stabilizers are found disclosed in the Kern et al., and Sitting articles referred to hereinabove, as well as U.S. Patent 3,152,101, issued to Dolce on Oct. 6, 1964, U.S. Patent 3,144,431, issued to Dolce, Berardinelli and Hudgin on Aug. 11, 1964, application Ser. No. 258,126, continuation-in-part of application Ser. No. 838,427, filed by Berardinelli on Sept. 8, 1959, application Ser. No. 838,832, filed by Dolce and Hudgin on Sept. 9, 1959, application Ser. No. 262,-348, continuation-in-part of application Ser. No. 841,690, filed by Kray and Dolce on Sept. 23, 1959, application Ser. No. 256,146, continuation-in-part of application Ser. No. 850,560, filed by Berardinelli, Kray and Dolce on Nov. 9, 1959, U.S. Patent 3,133,896 of Dolce and Berardinelli, issued May 19, 1964, and application Ser. No. 4,881 filed by Kray and Dolce on Jan. 27, 1960. The disclosures of the above-mentioned patents and commonly assigned applications are incorporated herein by reference.

The resin components may also be modified with chain branching or cross-linking agents, such as organic isocyanates or isothiocyanates, e.g., toluene diisocyanate, diphenyl methane diisocyanate, etc.

The colloidal dispersions of this invention are of excellent homogeneity and are generally of milky white appearance. Their stability to gelation or precipitation is extremely high, no evidence thereof being visually apparent at room temperature over periods of up to 1 year or more. As employed throughout the specification and claims, the term "colloidal dispersion" refers to subdivided polymer moieties suspended or emulsified in a liquid dispersion medium. The particle sizes range from about $10^{-3}$ centimeters in diameter down to about $10^{-6}$ centimeters or less, but are generally in excess of those found in a comparable true solutions. The disperse systems exhibit high molecular weights indicating some degree of molecular aggregation, and generally have the common properties of dispersoids, see e.g., the discussion of the colloidal state appearing at page 38 of The "Chemical Age" Chemical Dictionary (Ernest Benn, Ltd., London, 1924).

The cast products of this invention may be prepared by any common solvent casting technique, which may generally comprise dispersing the resin in a liquid medium, disposing the casting medium containing the film forming resin in a mold having the configuration of the desired product, and evaporating at least a major proportion of the volatile solvent medium. While the casting may be carried out at room temperatures, it is to be understood that temperatures in the range from 50° F. to 150° F. may also be employed to advantage in certain applications. Similarly, while room temperatures are commonly employed for volatilization of the solvent, optimization of volatilization rate may require the use of high temperatures. Such conventional casting aids as a doctor blade or a wire, set at the desired height above the mold surface, are commonly employed. While products of any desired thickness may be prepared with one or more applications of the casting syrup, films having a thickness in the range of 5 to 10 mils are preferred.

The cast products are of high gloss and surface smoothness, exhibit no directional stresses and have the desired properties of the cellulosic and the polyacetal blend, such as unexpectedly high melt strengths and elongation, described in the copending application of Price referred to hereinabove.

Optimum cast products were prepared from thermoplastic, moldable blends containing from 1 to about 10 weight percent of the preferred polyacetal copolymers or terpolymers, which were clear, transparent, and free of turbidity. The greatly preferred blend compositions contained cellulose acetate and the polyacetal copolymers referred to above. Optimum melt strength was secured with compositions of 4 to 6 weight percent of an oxymethylene copolymer containing a nominal 2.0 weight percent of oxyethylene units, and 54.5 AV cellulose acetate. It will of course be understood by the artisan that a variety of two or more polyacetals or cellulosic components may be employed to advantage in a particular composition.

"Melt index $1x$" as used herein, refers to test Condition E of ASTM–D–1238–57T, wherein a sample of the resin is heated in a standard cylinder to a standard temperature of 190° C. and forced under a standard load of 2.160 kg. through a standard orifice of 0.0825±0.002 in. diameter by 0.315±0.00 1 in. long for a standard period and weighing the resin passing through the orifice during this period. The "melt index ($10x$)" as used herein, is determined in the same manner, except that the standard load is increased tenfold to 21.6 kg. (Condition F). Generally, values are not directly comparable on the two scales by applying a factor of ten, since most commercial molding resins exhibit to some extent a non-Newtonian relation in flow properties taken on the respective scales. For example, commercial polyacetal copolymers commonly exhibit a ratio of $10x$ melt index/melt index $1x$ of between about 15 and 50. Tension properties, such as elongation and break strength values, were taken in accordance with ASTM–D–638–60T.

The following examples supplement without limitation the foregoing description. All parts are by weight, and all test data is reported in accordance with ASTM Standard methods, except as otherwise indicated.

Example I (A) A series of blends of 100 parts of crystalline cellulose propionate flake (having an average propionyl content of 2.32 out of 3.0, an average hydroxyl content of 0.26, and 0.42 average acetyl content; and a solution viscosity of 80 cps. (3 parts of flake in 50 ml. of 98% acetone/2% distilled water) plasticized with dibutyl sebacate (stabilized with 1.5 parts of an epoxy stabilizer and 0.25 part of triphenyl phosphite per 100 parts of cellulosic) and an oxymethylene copolymer containing a nominal 2.0 weight percent of oxyethylene units (melt index ($1x$) of 2.5 dg./min.) stabilized with amidine compound and 2,2′-methylene bis (4-methyl-6-t-butyl phenol) were prepared by charging 5 parts of the dry cellulosic blend to a roll mill maintained at a temperature in the range of 200 to 330° F., rolling for 3 minutes, charging the pelletized oxymethylene copolymer and rolling for 1 minute, cutting down the rolled admixture and refeeding to the rolls for 2 minutes, adding the remaining 45 parts of the dry cellulosic component and rolling for 5 minutes, cutting down and refeeding for 9 minutes, reducing roll speed and taking off for 8 minutes. The mixing appeared homogeneous and complete. The resulting blend was pelletized in conventional fashion, and exhibited the following viscosity (3 parts in 50 ml. of 98% acetone/2% distilled water):

| Plasticizer (analyzed) (parts) | Polyacetal (parts charged) | Pellet viscosity (cps.) |
| --- | --- | --- |
| 10 | 0 | 35 |
| 10 | 1.5 | 39 |
| 9 | 3.0 | 37 |
| 9 | 4.5 | 41 |

Colloidal suspensions were prepared by cooling the blend to room temperature, adding 50 parts to 200 cc. of acetone at room temperature, and allowing the dispersion to stand with occasional agitation for 24 hours. The dispersion was stable, homogeneous, and milky white. The viscosity was in the range of that exhibited by maple syrup or glycerine at room temperature. 8–10 mil films were cast at 73° F. by pouring the dispersion onto a flat glass plate, and spreading the viscous material with a laboratory doctor blade set at about 40 mils above the mold surface. Solvent was evaporated at room temperature for 20–30 minutes, and the film readily stripped from the mold surface and hung overnight to further dry. The resulting film was tough and coherent, showed no separation of the polyacetal and cellulosic components, exhibited no gels or other surface anomalies and appeared completely homogeneous. The film was of high gloss, of translucent to transparent light transmitting characteristics, and was clear of light interfering anomalies. ½" x 2¼" discs were compression molded at 200° C. and 10,000 p.s.i. over a period of 15 minutes. Standard 8½" tensile bars were injection molded at 405–410° F., and 10,000 lbs. pressure for a total cycle of 30 seconds.

The following physical properties were exhibited by molded articles and cast films, respectively. Melt values are reported for the pelletized blend, haze was measured on the molded discs, the tensile properties were taken on the injection molded tensile bars, and moisture vapor transmission is reported for the 8–10 mil cast film.

| Run No. | I | II | III | IV |
| --- | --- | --- | --- | --- |
| Polyacetal, parts | 4.5 | 3.0 | 1.5 | 0 |
| Melt index: | | | | |
| 1X, dg./min | 1.0 | 1.1 | 1.2 | 1.3 |
| 10X, dg./min | 85 | 94 | 93 | 100 |
| Melt index parison elongation, minutes per 9½" elongation | 5'–43" | 6'–03" | 5'–56" | 4'–49" |
| Haze, percent (½" disc) | 19 | 11 | 6.7 | 5.5 |
| Izod impact at 73° F., ft. lb./in. notch | 4.6 | 5.3 | 4.7 | 4.4 |
| Flexural modulus, p.s.i. × $10^5$ | 2.68 | 2.58 | 2.58 | 2.78 |
| Moisture vapor transmission, gm./24 hours/meter $^2$ | 105 | 105 | 106 | 102 |

The parison elongation data was obtained by preheating blend pellets in an extrusion plastometer (described in ASTM–D–1238–57T) for 6 minutes at 190° C., charging a standard 1x weight (2.160 kg.) to the piston, extruding a 1 inch parison, removing the 1x weight and attaching a 0.65 gm. weight to the bottom of the extrudate to accelerate "neck-down." The time required for the parison to "neck-down" to 9½ inches total length was recorded. All other reported values were taken according to ASTM Standard Methods (haze: D–1003–61; Izod: D–256–53T; flexural modulus: D–790–59T; moisture vapor transmission: E–96–53T).

(B) An otherwise identical blend was prepared except that the preparation was by cosolution and coprecipitation of the resin components. When 50 parts were added to 200 cc. of acetone at room temperature, the cellulosic polymer dissolved, and the polyacetal settled out, remaining unsuspended at the bottom of the container even after vigorous mixing.

Example II

Levels of up to 33 parts (23 weight percent) of the polyacetal were obtained with a basic cellulosic composition of 100 parts of cellulose propionate (average propionyl content 2.32, average hydroxy content 0.26, 0.42 average acetyl content, and a solution viscosity of 80 cps.), 9.0 parts of dibutyl sebacate, 1.75 parts of an epoxy stabilizer, and 0.30 parts of triphenyl phosphite, by blending in a "Brabender Plasticorder" at 190–210° C. for 8–10 minutes. A colloidal suspension in acetone identical to that reported in Example I was obtained with each sample.

Example III

Blends of cellulose acetate (54.5 acetyl value, solution viscosity of 85 cps. in (3 parts) 95% acetone/5% distilled water) and an oxymethylene copolymer containing a nominal 2.0 weight percent of oxyethylene units (melt index (1x) of 2.5 dg./min., stabilized with an amidine compound and 2,2'-methylene bis (4-methyl-6-t-butyl phenol) were prepared with a basic cellulosic composition of 100 parts cellulose acetate, 22 parts diethyl phthalate, 1.71 parts of an epoxy stabilizer, and 0.29 part of triphenyl phosphite in a "Brabender Plasticorder" at 190–210° C. for 8–10 minutes. Colloidal suspensions and cast films were prepared in identical fashion to that described in Example I, with comparable results. Physical properties taken on 8–10 mil cast films were as follows:

| Polyacetal (parts) | Tensile strength at yield, p.s.i. | Tensile strength at break, p.s.i. | Elongation, percent |
| --- | --- | --- | --- |
| 5.4 | 3,900 | 5,100 | 24 |
| 17.3 | 5,200 | 5,300 | 11 |
| 20.8 | 5,900 | 5,700 | 10 |

Example IV

A series of blends and colloidal suspension were prepared according to the process of Example III, containing up to a maximum of 29 parts by weight (19%) of the polyacetal, with comparable results to those reported in the preceding examples.

It is to be understood that the foregoing detailed description is given merely by way of illustration and that many variations may be made therein without departing from the spirit of my invention.

The embodiments of the invention in which an exclusive property or privilege is claimed are defined as follows:

1. A colloidal dispersion comprising
    (1) a homogeneous thermoplastic blend of
        (a) a moldable cellulose polymer having free hydroxyl groups, and
        (b) up to about 50 weight percent, based on the blend, of a high molecular weight moldable oxymethylene polymer having at least 60 mol percent of recurring oxymethylene units; and
    (2) from about 50 to about 1000 cc. per 50 parts by weight of said blend, of a dispersion medium comprising an inert volatile organic solvent for said cellulosic component.

2. The colloidal dispersion of claim 1, wherein said cellulose polymer has at least 0.2 free hydroxyl groups per anhydroglucose unit.

3. The colloidal dispersion of claim 2, wherein said oxymethylene polymer has a number average molecular weight of at least 20,000.

4. The colloidal dispersion of claim 3, wherein said cellulose polymer is esterified with at least one carboxylic acid having from 2 to 6 carbon atoms.

5. The colloidal dispersion of claim 4, wherein said cellulose polymer is cellulose acetate.

6. The colloidal dispersion of claim 4, wherein said cellulose polymer is cellulose propionate.

7. The colloidal dispersion of claim 4, wherein said oxymethylene polymer is selected from the group consisting of
    (1) oxymethylene copolymers having at least one chain containing at least 85 mol percent of recurring oxymethylene units interspersed with up to about 15 mol percent of —OR— units, wherein R is a divalent radical containing at least two carbon atoms directly linked to each other and positioned in the chain between the two valences, with any substituent in the R radical being inert, and (2) oxymethylene terpolymers, having at least one chain containing at least 85 mole percent of oxymethylene (—CH₂O—) units interspersed with up to about 15 mol percent of —OR— units, wherein R is a divalent radical containing at least two carbon atoms directly linked to each other and positioned in the chain between the two valences, with any substituent in the R radical being inert, at least 0.01 up to 7 mol percent of said —OR— units having carbon atoms linked to other chains.

8. A homogeneous, stable, colloidal dispersion comprising
(1) a moldable blend of
   (a) from about 60 to about 99 weight percent of a moldable cellulose component comprising
      (i) a cellulose compound esterified with at least one carboxylic acid having from 2 to 6 carbon atoms, having an average of at least 0.3 free hydroxyl groups per anhydroglucose unit, and exhibiting a 10x melt index of between about 0.1 and 1500 dg./min., and
      (ii) a plasticizing amount of a plasticizer therefor; and
   (b) from about 1 to about 40 weight percent of an oxymethylene component comprising a moldable oxymethylene copolymer having at least one chain containing at least 85 mol percent of recurring oxymethylene units interspersed with up to about 15 mol percent of —OR—units, wherein R is a divalent radical containing at least two carbon atoms directly linked to each other and positioned in the chain between the two valences, with any substituent in the R radical being inert, said copolymer having a number average molecular weight of between about 20,000 and 80,000, and a 10x melt index of between about 10 and 900 dg./min.;
uniformly dispersed in
(2) from about 50 to about 1000 cc. per 50 parts by weight of said blend, of a dispersion medium comprising an inert volatile organic solvent for said cellulosic component.

9. A homogeneous stable colloidal dispersion comprising
(1) a moldable blend of
   (a) from about 90 to about 99 weight percent of a cellulose component comprising
      (i) a cellulose acetate having from about 2.4 to about 2.7 acetyl groups per anhydroglucose unit and a 10x melt index of between about 0.1 and 1500 dg./min.,
      (ii) from about 15 to about 70 parts per 100 parts of said cellulose acetate, of a plasticizer therefor; and
   (b) from about 1 to about 10 weight percent of an oxymethylene component comprising an oxymethylene copolymer having at least one chain containing at least 85 mol percent of (—OR—) units, wherein R is a divalent radical containing at least two carbon atoms directly linked to each other and positioned in the chain between the two valences, with any subsituent in the R radical being inert, said copolymer having a number average molecular weight of between about 30,000 and 80,000, and a 10x melt index of between about 10 and 900 dg./min.;
uniformly dispersed in
(2) from about 50 to about 1000 cc. per 50 parts by weight of said composition, of a dispersion medium comprising an inert volatile organic solvent for said cellulosic component.

10. The colloidal dispersion of claim 9, wherein said dispersion components are uniformly dispersed throughout the dispersion medium with a particle size of between about $10^{-3}$ and $10^{-6}$ centimeters.

11. A cast product of the colloidal dispersion of claim 1.

12. A cast film of the colloidal dispersion of claim 1.

13. A process for the preparation of colloidal dispersions comprising
(1) blending
   (a) a moldable cellulose polymer having free hydroxyl groups, and
   (b) up to about 50 weight percent, based on the blend, of a high molecular weight moldable oxymethylene polymer having at least 60 mol percent of recurring oxymethylene units, at a temperature above the melting point of at least one of said blend components; and
(2) charging said blend to from about 50 to about 1000 cc. per 50 parts of said blend of a dispersion medium comprising an inert volatile organic solvent for said cellulose component.

14. The process of claim 13, wherein said blend components are
(a) a cellulose polymer having at least 0.3 free hydroxyl groups per anhydroglucose unit, and
(b) from about 1 to about 40 weight percent of a moldable oxymethylene copolymer having at least one chain containing at least 85 mol percent of (—OR—) units, wherein R is a divalent radical containing at least two carbon atoms directly linked to each other and positioned in the chain between the two valences, with any substituent in the R radical being inert, said copolymer having a number average molecular weight between about 20,000 and 80,000 and a 10x melt index of between about 10 and 900 dg./min.

15. The process of claim 14, wherein said temperature is between about 100 and 220° C.

16. A process for the preparation of cast products comprising
(1) blending
   (a) a moldable cellulose polymer having free hydroxyl groups, and
   (b) up to about 50 weight percent, based on the blend, of a high molecular weight moldable oxymethylene polymer having at least 60 mol percent of recurring oxymethylene units, at a temperature above the melting point of at least one of said blend components;
(2) charging said blend to from about 50 to about 1000 cc. per 50 parts of said blend of a dispersion medium comprising an inert volatile organic solvent for said cellulose component;
(3) disposing the thus formed colloidal dispersion upon a mold surface; and
(4) volatilizing at least a major proportion of said dispersion medium.

References Cited
UNITED STATES PATENTS

| | | | |
|---|---|---|---|
| 2,376,934 | 5/1945 | Morgan | 260—17 |
| 2,566,794 | 9/1951 | Defing | 260—17 |
| 3,053,792 | 9/1962 | Ikeda | 260—17 |
| 2,469,318 | 5/1949 | Swan | 260—17 |
| 3,284,382 | 11/1966 | Rosser et al. | 260—17 |

WILLIAM H. SHORT, *Primary Examiner.*

E. M. WOODBERRY, *Assistant Examiner.*